United States Patent [19]

Chapman et al.

[11] 3,880,781

[45] Apr. 29, 1975

[54] PROCESS FOR PRODUCTION OF CELLULAR OR FOAMED POLYURETHANE FROM POLYETHERS WITH AND WITHOUT CATALYST

[75] Inventors: John Frederick Chapman; John Henry Cundall, both of Manchester, England; Robert Paul Gentles, Linlithgow, West Lothian, Scotland; Philip Cowey Johnson; Kenneth Stephenson, both of Manchester, England

[73] Assignee: Imperial Chemical Industries Limited, London, England

[22] Filed: May 29, 1969

[21] Appl. No.: 834,193

Related U.S. Application Data

[63] Continuation of Ser. No. 521,809, Jan. 20, 1966, abandoned, which is a continuation of Ser. No. 257,762, Feb. 11, 1963, abandoned, which is a continuation-in-part of Ser. No. 833,161, Aug. 12, 1959, abandoned.

[52] U.S. Cl. . 260/2.5 AC; 260/2.5 AP; 260/2.5 AT
[51] Int. Cl. .................... C08g 22/46; C08g 22/38
[58] Field of Search .... 260/2.5 AP, 2.5 AT, 2.5 AC

[56] References Cited
UNITED STATES PATENTS

| | | | |
|---|---|---|---|
| 2,888,409 | 5/1959 | Bender et al. | 260/2.5 |
| 2,921,915 | 1/1960 | Brochhagen et al. | 260/2.5 |
| 2,948,691 | 8/1960 | Windemuth et al. | 260/2.5 |
| 3,042,632 | 7/1962 | Erner | 260/2.5 |
| 3,072,582 | 1/1963 | Frost | 260/2.5 |
| 3,194,773 | 7/1965 | Hostettler | 260/2.5 |

FOREIGN PATENTS OR APPLICATIONS

| | | | |
|---|---|---|---|
| 221,411 | 5/1959 | Australia | 260/2.5 |
| 797,299 | 7/1958 | United Kingdom | 260/2.5 |

*Primary Examiner*—Herbert S. Cockeram
*Attorney, Agent, or Firm*—Cushman, Darby, and Cushman

EXEMPLARY CLAIM

1. A catalyst-free process for the manufacture of foamed polyurethane products by substantially simultaneously interacting an organic polyisocyanate composition consisting essentially of a diarylmethane diisocyanate and 5–50% by weight of organic polyisocyanate having more than two isocyanato groups to the molecule, a liquid polyether having predominently secondary hydroxyl end groups containing from 3 to 8 hydroxyl groups per molecule and water in the absence of a catalyst for said interaction.

18 Claims, No Drawings

PROCESS FOR PRODUCTION OF CELLULAR OR FOAMED POLYURETHANE FROM POLYETHERS WITH AND WITHOUT CATALYST

This is a continuation of prior application Ser. No. 521,809, filed Jan. 20, 1966 which, in turn, is a continuation of prior application, Ser. No. 257,762, filed Feb. 11, 1963 which, in turn, is a continuation-in-part of prior application Ser. No. 833,161, filed Aug. 12, 1959, all of which prior applications now are abandoned.

The present invention relates to improvements in the production of cellular or foamed polymeric materials and, more particularly, foamed polyurethanes manufactured by a one-stage reaction of polyethers, organic isocyanates and water.

Foamed polyurethane products are useful for many purposes including thermal insulation and shock-absorbing cushions. They are manufactured by entrapping a gas, usually carbon dioxide, in a gelatinous or liquid mass of polyurethane as the resin is stiffening or setting up from the liquid state. The technology rests on the use of organic isocyanates which are capable of reacting with certain active hydrogen groups such as —COOH, —NH$_2$ and —OH and also with water.

The first cellular resins based on isocyanates were manufactured by reacting isocyanates such as tolylene diisocyanate with polyesters having carboxylic acid groups at the ends of the chains. However, it was subsequently found more convenient to use polyesters having hydroxyl groups at the ends of the chains. In this case, the reaction is carried out in the presence of water; hydroxyl-ended polyesters react with the isocyanates to form polyurethanes, while water reacts with the isocyanates to produce carbon dioxide gas. The polyesters used were usually liquids, these being easily mixed with isocyanates at room temperature.

The reaction can be carried out in one or two stages. The one stage reaction involves simultaneous interaction of the polyester, isocyanate and water, and is commonly referred to as the one-shot method. It has certain obvious advantages in reducing the amount of equipment required and saving time. The reactions also employ, e.g. tertiary amine catalysts and surface active agents to help retain gas in the resin and control the size of gas cells. In the one-shot process, it is necessary to choose the reaction mixture ingredients so as to maintain a careful balance between two reactions which are taking place simultaneously, formation of high molecular weight polyurethane resin and formation of carbon dioxide gas. If the polymerisation reaction lags, the viscosity of the liquid does not rise sufficiently rapidly and gas escapes. This gives a non-uniform and an undesirably dense product and is wasteful of expensive isocyanate. In the two-stage reaction, the polyester reacts with excess isocyanate in a first stage to form a low molecular weight isocyanate-ended condensate known as a prepolymer. In the second stage, the prepolymer reacts with water to induce foaming. This two-stage reaction has not been widely employed with polyesters but has some advantages for foaming in inadequately ventilated areas because it reduces the hazards of handling toxic free isocyanate.

More recently, efforts have been made to substitute hydroxyl-ended polyethers, such as polyethylene glycol and polypropylene glycol, for the polyesters. However, this has met with difficulties. Of the polyethers, ethylene oxide polymers are not entirely suitable as replacements for the liquid polyesters because they are solids and because of their hydrophilicity. Attention was therefore turned to propylene oxide polymers which are liquids. The simple substitution in a one-shot foam formulation of a polyester by a propylene oxide polymer of similar hydroxyl content does not however yield a satisfactory foam. In each case practically the whole of the gas escapes from the mixture leaving a product of unacceptably high density. It appears that the mixture does not increase in viscosity sufficiently rapidly. Two reasons for this have been put forward. In the first place the polyethers themselves have lower viscosities than polyesters. Secondly the hydroxyl groups of propylene oxide polymers being predominantly secondary in character are less reactive towards isocyanates than the hydroxyl groups of the polyesters employed (usually from diethylene glycol and adipic acid) which are primary.

In spite of the considerable experience gained with polyesters no convenient way was found to avoid this difficulty with polyethers so the art turned to the two-stage reaction. In this, part of the polymerisation reaction takes place before water is added, giving this reaction a head start over the gas-forming reaction. Of course, this is less convenient, but it has enabled the use of polyethers in a urethane-forming process.

Subsequent to filling the aforesaid application Ser. No. 833,161, it has come to light that certain organo-tin-compounds now described in British Patent 892,136 published Mar. 21, 1962 are, unlike the prior art catalysts, useful in permitting the one-shot process when such polyethers are used. However, even these are not fully satisfactory since they tend to promote degradation of the cellular polyurethane product.

The present invention overcomes these difficulties and is based upon the discovery that excellent foamed products which may be flexible or rigid in nature may be obtained by substantially simultaneously interacting certain polyisocyanate compositions based on diarylmethane diisocyanates with polyethers containing not less than 3 hydroxyl groups per molecule and water.

Thus according to our invention we provide a process for the manufacture of foamed polyurethane products by substantially simultaneously interacting an organic polyisocyanate composition comprising a major proportion of a diarylmethane diisocyanate and at least 5% by weight of an organic polyisocyanate having more than two isocyanato groups per molecule, a polyether containing not less than 3 hydroxyl groups per molecule and water.

Especially suitable diarylmethane diisocyanates are diphenylmethane diisocyanate and phenyltolylmethane diisocyanate. Other diarylmethane diisocyanates which may be used in the process of this invention include mono- and di-alkyl diphenylmethane diisocyanates such as the ethyl derivatives, mono- and di-chlorodiphenylmethane diisocyanates and mono- and di-alkoxy diphenylmethane diisocyanates such as the methoxy derivatives. The diarylmethane diisocyanates may be made for example by phosgenating the corresponding diamines or the polyamine compositions obtained by condensing formaldehyde with aromatic amines or mixtures thereof.

The content of polyisocyanate of functionality greater than two may be introduced into the polyisocyanate composition in many different ways, for example as follows 1. A polyisocyanate containing more than two isocyanate groups may be added directly to the diarylmethane diisocyanate; thus for example there may be added toluene-2:4:6-triisocyanate, benzene-1:3:5-triisocyanate, diphenylmethane-2:4:4'-triisocyanate, 2:4:4'-triisocyanatodiphenyl, 2:4:4'-triisocyanate diphenyl ether, and the like.

2. Some of the diarylmethane diisocyanate may be interacted with a polyhydric alcohol, thereby forming a polyisocyanate containing three or more isocyanate groups per molecule; thus for example it may be interacted with trimethylolpropane, glycerol, hexanetriol or pentaerythritol.

3. The diarylmethane diisocyanate may be partially polymerised to form isocyanurate derivatives. Such polymerisation of the diarylmethane diisocyanate may be achieved by the action of catalysts such as sodium methoxide, soduim phenate, or other basic catalysts for example alkali metal salts of weak acids, alkali metal oxides or hydroxides, or soluble metal salts such as lead-2-ethyl hexoate or zinc naphthenate.

4. During the manufacture of the diarylmethane diisocyanate by phosgenation of crude diaminodiarylmethane, triamines and other polyamines are also phosgenated and give rise to polyisocyanates of functionality greater than two. Likewise during the phosgenation process polymerisation of the diisocyanate may occur.

The method whereby the polyisocyanate of functionality greater than two is introduced into the polyisocyanate composition is not critical, provided that the content thereof is between 5% and 50%, and preferably between 15% and 40% by weight of the composition.

It is preferred that the carbamyl chloride content of the polyisocyanate composition, which may be introduced during the phosgenation process, should lie between such limits that the measured ionisable chlorine content is from 0.01% to 3.0% by weight.

The polyethers for use in the process of the present invention may be any hydroxyl-ended polymers or copolymers, containing at least 3 hydroxyl groups per molecule, made by the polymerisation of cyclic ethers such as epichlorhydrin, tetrahydrofuran, oxacyclobutane and substituted oxacyclobutanes, but especially useful are polyethers made from 1:2-alkylene oxides such as ethylene oxide and 1:2-propylene oxide. Such polyethers or copolyethers are conveniently prepared by the methods known in the art, for example by reacting together, at 100°–150°C. and 5–50 lb./sq.in. pressure and usually in the presence of an alkaline catalyst such as potassium hydroxide, a 1:2-alkylene oxide or a mixture of 1:2-alkylene oxides and a compound containing at least 3 reactive hydrogen atoms per molecule. As compounds containing at least 3 reactive hydrogen atoms per molecule there may be mentioned polyols such as glycerol, hexanetriol, trimethylol propane, pentaerythritol, sorbitol and sucrose, which result in branched polyethers having at least 3 hydroxyl groups per molecule. The reaction of the 1:2-alkylene oxide with the reactive hydrogen-containing compound may, if desired, be carried out in two or more stages and the same or a different 1:2-alkylene oxide may be used in the different stages.

Suitable polyethers containing at least 3 hydroxyl groups per molecule may also be obtained by copolymerising the cyclic oxide, for example ethylene oxide, propylene oxide or tetrahydrofuran with minor proportions of diepoxides. Alternatively, a polyalkylene ether glycol, for example polypropylene glycol, may be reacted with a polyisocyanate containing more than two isocyanate groups per molecule, or a carboxylic acid containing more than two reactive groups per molecule, of which examples are trimesic acid, aspartic acid, dihydroxystearic acid and polymethacrylic acid. The proportions of polyisocyanate or polycarboxylic acid used are not more than the minimum amount required to combine with all the hydroxyl groups present in the polyether.

The preferred polyethers of this invention are those prepared from a major proportion of propylene oxide, using a basic catalyst for example potassium hydroxide.

Mixtures of polyethers of the same or differing functionality may be used if desired.

The preparation of the foamed polyurethane materials is carried out by mixing the polyisocyanate, the polyether and the water simultaneously with any other additives selected to give specific properties to the final foam. Thus it is conventional in the preparation of foamed polyurethane materials to include a catalyst in the reaction mixture to accelerate the foam-forming reactions and ensure their completion within a reasonable length of time. The nature and proportion of catalyst to be employed in any particular case depends to a large extent upon the reactivities of the various foam-forming components and particularly upon the hydroxyl functionality and molecular weight of the hydroxyl group-containing polyether. In many instances, for example where a polyether having at least 3 hydroxyl groups for each 500 units of molecular weight is used, the addition of a catalyst may not be necessary. In instances where the interaction proceeds less rapidly as, for example, where a polyether having less than 3 hydroxyl groups for each 500 units of molecular weight is used, it is usually advantageous to employ a small proportion of a catalyst. In all cases, of course, the result which it is desired to achieve is the deciding factor. Thus, even in a fast reacting formulation it may sometimes be desired to increase the rate of reaction further by the addition of a catalyst whilst in other cases there may be reasons for preferring a slow reaction.

Suitable catalysts are well-known in the art and include basic materials, non-basic tertiary amine salts and non-basic metallic compounds soluble in organic solvents. Examples of suitable basic materials include potassium acetate, metallic oxides, for example zinc oxide, barium oxide and litharge and tertiary amines, for example dimethyl cyclohexylamine, dimethylbenzylamine, diethylaminopropionamide, dimethylaminopropionamide, triethylamine, N-methylmorpholine, N-ethylmorpholine, N-methylpiperidine and bis(2-diethylaminoethyl)adipate. Basic-reacting salts of tertiary amines may also be used. Also suitable are tertiary amine salts having a non-basic reaction such as dimethylbenzylamine lactate. Suitable organic solvent-soluble metallic compounds include the acetylacetonates of iron, manganese, zinc, cobalt and nickel, the naphthenates of cobalt, manganese and lead and the carbonyls of iron and nickel.

Unlike the organo-tin compounds, the abovementioned catalysts are not sufficiently active to allow the manufacture of foams from polyethers by a one-shot process when, for example, tolylene diisocyanate is employed as the organic polyisocyanate nor do they promote the degradation of cellular polyurethanes.

It is also conventional in the art to include surface-active agents in the polyurethane foam-forming reaction mixture. The functions of such agents are to modify the pore structures of the products and to assist in the mixing of the components. Suitable surface-active agents include reaction products of ethylene oxide with alkyl phenols or with long chain alcohols such as oleyl or cetyl alcohols. The use of these materials in conjunction with nucleating agents is especially advantageous.

However, it is particularly preferred to use, optionally in conjunction with one of the surface-active agents already mentioned an alkylated cellulose derivative, in particular ethyl cellulose. This alkylated cellulose derivative is normally used in an amount of between 0.01% and 2.0% by weight of the weight of polyether. Especially advantageous results are achieved when the alkylated cellulose derivative is dissolved in the reaction medium, in particular in the polyether, in an amount of between 0.05 and 0.15% by weight of the weight of polyether.

Fillers, colouring matters, flame-proofing agents such as tri($\beta$-chloroethyl)phosphate which does not take part in the foam-forming reaction, plasticisers or other materials, preferably not reactive with isocyanates, may be added to the mixture at an appropriate stage. Solids may be added as dry powders or as premixed pastes with, for example, the polyether or the polyisocyanate.

The process of this invention is suitable for the production of foamed polyurethane products which are superior to the corresponding polyester-based materials in their resistance to hydrolysis. The lower toxic hazard associated with the polyisocyanates described in this invention is a great advantage in the production of such foamed products in situ. By the use of only slightly branched polyethers, flexible foams are obtained which are useful in upholstery, carpet underlays, packaging and many other applications. The use of polyethers which are more highly branched yields rigid foams which can be employed in for example thermal and acoustic insulation and in building construction work.

This invention is illustrated but not limited by the following Examples in which parts and percentages are by weight.

EXAMPLE 1

100 Parts of the liquid polyether prepared by the reaction of 500 parts of propylene oxide with 342 parts of sucrose are mixed with 4 parts of water, 15 parts of tri-($\beta$-chloroethyl)phosphate, and 1 part of the product obtained by the condensation of 2.5 mols. of ethylene oxide with 1 mol. of a cetyl/oleyl alcohol mixture. To this mixture are added 179 parts of a diphenylmethane diisocyanate composition and the mixture is stirred vigorously for 3 minutes, and then poured into a mould. A rigid foamed product is obtained, having a density of 2.6 lb. per cubic foot and compression strength of 140 lb. per 2 inch cube.

The liquid polyether used in this Example has a molecular weight of 947, a hydroxyl value of 474 mg. KOH/g. and viscosity of 2425 centistokes.

The diphenylmethane diisocyanate composition used in this Example is prepared by phosgenating crude diaminodiphenylmethane, containing about 15% of polyamines(mainly triamines)obtained by condensing formaldehyde with aniline in the presence of hydrochloric acid.

EXAMPLE 2

100 Parts of a liquid polyether made by the reaction of 1968 parts of propylene oxide with 342 parts of sucrose are mixed with 4 parts of water, 1 part of the product obtained by the condensation of 9.5 mols. of ethylene oxide with 1 mol. of octyl cresol, and 15 parts of tri-($\beta$-chloroethyl)-phosphate. 119 Parts of the diphenylmethane diisocyanate composition of Example 1 are added, and the mixture is stirred vigorously for 3 minutes and is then poured into a mould. The mix foams to give a rigid cellular product of density 3.3 lb. per cubic foot and compression strength of 100 lb. per 2 inch cube.

The liquid polyether used in this Example has a molecular weight of 1941, a hydroxyl value of 231 mg. KOH/g. and viscosity of 1068 centistokes.

EXAMPLE 3

50 Parts of a liquid polyether prepared by the addition of propylene oxide to 1:2:6-hexanetriol and having a hydroxyl value of 240 mg. KOH/g. are mixed with 67.5 parts of the diphenylmethane diisocyanate composition of Example 1, 1.5 parts of water and 0.5 part of N:N-dimethylcyclohexylamine. The fluid mixture is poured into a mould and allowed to stand at room temperature. The product is a rigid foam of low density and high compression strength.

EXAMPLE 4

100 Parts of a liquid polyether, prepared by the reaction, of 1193 parts of propylene oxide with 750 parts of trimethylolpropane and having a hydroxyl value of 479 mg. KOH/gm. a molecular weight of 354 and a viscosity of 1152 centistokes at 25°C. are mixed with 4 parts of water, 5 parts of a condensate of a cetyl/oleyl alcohol mixture with 2.5 molecular proportions of ethylene oxide, and 15 parts of tri-($\beta$-chloroethyl)phosphate as flame-proofing agent. To this mixture are added 177 parts of the diphenylmethane diisocyanate composition of Example 1, and the mixture is stirred vigorously for 3 minutes and then poured into a mould. A rigid, foamed product is formed, having a density of 3.5 lb. per cubic foot and a compression strength of 145 lb. per 2 inch cube.

EXAMPLE 5

100 Parts of the liquid polyether of Example 4 are mixed with 2 parts of water, 10 parts of a 66% aqueous solution of N:N-dimethylbenzylamine lactate, 15 parts of tri-($\beta$-chloroethyl) phosphate and 5 parts of a condensate of octyl cresol with 9.5 molecular proportions of ethylene oxide. 147 Parts of a 4:4'-diisocyanato-3-methyldiphenylmethane composition are added, and the mixture is stirred vigorously for 2 minutes and is then poured into a mould, where it foams to form a rigid cellular structure of density 4.7 lb. per cubic foot and compression strength of 295 lb. per 2 inch cube.

The 4:4'-diisocyanato-3-methyldiphenylmethane composition used in this Example is prepared by phosgenating crude 4:4'-diamino-3-methyldiphenylmethane, containing about 15% of polyamines(mainly triamines)obtained by condensing aniline, o-toluidine and formaldehyde in the molecular proportions 3.3:1.1:1.0 in the presence of hydrochloric acid.

EXAMPLE 6

100 Parts of the liquid polyether of Example 4 are mixed with 15 parts of a 66% aqueous solution of N:N-dimethylbenzylamine lactate, 5 parts of a condensate of a cetyl/oleyl alcohol mixture with 2.5 molecular proportions of ethylene oxide, and 15 parts of tri-($\beta$-chloroethyl)phosphate. To this mixture are added 140 parts of the 4:4'-diisocyanato-3-methyldiphenylmethane composition used in Example 5, and the whole is vigorously stirred for 1½ minutes, after which time the foaming reaction begins. The mix is poured into a mould, where it foams rapidly to form a cellular, rigid structure of density 4.3 lb. per cubic foot and compression strength of 273 lb. per 2 inch cube.

EXAMPLE 7

Into 100 parts of the liquid polyether prepared by the addition of 1075 parts of propylene oxide to 435 parts of sorbitol to give a product of hydroxyl value 521 mg. KOH/gm. and a viscosity at 25°C. of 8240 centistokes, are mixed 4 parts of water and 1 part of the condensation product of octyl cresol with 9.5 molecular proportions of ethylene oxide. 192 Parts of the diphenylmethane diisocyanate composition of Example 1 are added and the mixture is agitated thoroughly for 3 minutes, when foaming occurs at a moderate rate. A rigid product of extremely fine cellular structure, with a density of 3.2 pounds per cubic foot and a high compression strength is obtained.

EXAMPLE 8

Into 100 parts of the liquid polyether prepared by the addition of 1740 parts of propylene oxide to 1200 parts of trimethylolpropane to give a product of molecular weight 332, a hydroxyl value of 518 mg. KOH/gm. and a viscosity at 100°C. of 13 centistokes, are mixed 4 parts of water and 1 part of ethyl cellulose having an ethoxyl content between 47.5 and 49.0% and a viscosity of 10 centipoises in a 5% solution in an 80:20 toluene: ethanol solvent at 25°C. 188 parts of the diphenylmethane diisocyanate composition of Example 1 are added, and the mixture is vigorously stirred for 3 minutes, when foaming occurs at a moderate rate. A rigid cellular structure with extremely fine spherical cells is formed, having a high compression strength and a density of 3.4 pounds per cubic foot.

EXAMPLE 9

Into 100 parts of the liquid polyether prepared by the addition of 2665 parts of propylene oxide to 1104 parts of glycerol to give a product of molecular weight 291, a hydroxyl value of 577 mg. KOH/gm. and a viscosity at 25°C. of 652 centistokes, are added 4 parts water and 1 part of the ethyl cellulose used in Example 8. 204 Parts of the diphenylmethane diisocyanate composition of Example 1 are added, and the mixture is agitated thoroughly for 3 minutes. Foaming occurs and a regular cellular rigid product is formed, with a density of 3.0 pounds per cubic foot.

EXAMPLE 10

Into 100 parts of the liquid polyether prepared by the addition of 1965 parts of propylene oxide to 1300 parts of trimethylolpropane to give a product of molecular weight 328, a hydroxyl value of 514 mg. KOH/gm. and a viscosity at 25°C. of 1340 centistokes, are mixed 4 parts of water and 1 part of the ethyl cellulose used in Example 8. 164 Parts of the 4:4'-diisocyanato-3-methyldiphenylmethane composition used in Example 5 are added. The mixture is vigorously agitated for 3 minutes when it foams to give a rigid cellular product of regular texture and density 3.2 pounds per cubic foot.

EXAMPLE 11

100 Parts of a polyether prepared by the reaction of 3100 parts of propylene oxide with 550 parts of glycerol in the presence of 11 parts of potassium hydroxide, and having a molecular weight of 609, are mixed with 2 parts of a 33% solution of manganese bis-(2:4-pentanedione)in pyridine, 2 parts of a reaction product of octyl phenol and ethylene oxide, 2 parts of the sodium salt of sulphated methyl oleate, and 3 parts of water.

63 Parts of the diphenylmethane diisocyanate composition used in Example 1 are added and the mixture is stirred vigorously for one minute and poured into a mould.

A foam having a density of about 3.5 pounds per cubic foot with a fine pore structure is obtained.

EXAMPLE 12

100 Parts of a polyether of hydroxyl value 283 mg. KOH/gm. prepared by the reaction of 3130 parts of propylene oxide with 900 parts of trimethylolpropane in the presence of 11.5 parts of potassium hydroxide, the catalyst being removed from the resin by adsorbtion on active carbon are mixed with 1 part of water, 3 parts of a 40% aqueous solution of potassium naphthenate, and 1.2 parts of a 33% solution of iron tris-(2:4-pentanedione)in pyridine.

63 Parts of the diphenylmethane diisocyanate composition of Example 1 are added and the mixture stirred vigorously for one minute and poured into a mould.

A foam having a density of about 3.5 pounds per cubic foot and of fine pore structure is obtained.

EXAMPLE 13

1500 Parts of a polyether having a hydroxyl value of 270 mg. KOH per gm. and made by the reaction of 3545 parts of propylene oxide with 552 parts of glycerol in the presence of a solution of 11 parts of potassium hydroxide in 5.5 parts of water, are heated for 3 hours at approximately 100°C. with 1.5 parts of the ethyl cellulose used in Example 8. 50 Parts of the resultant solution of ethyl cellulose in polyether are mixed with 1.5 parts of water. This mixture is then stirred for 30 seconds with the diphenylmethane diisocyanate composition used in Example 1 and poured into a mould. A fine textured uniform foam having a density of about 3.5 pounds per cubic foot and a high compression strength is obtained.

We claim:

1. A catalyst-free process for the manufacture of foamed polyurethane products by substantially simultaneously interacting an organic polyisocyanate composition consisting essentially of a diarylmethane diisocyanate and 5–50% by weight of organic polyisocyanate having more than two isocyanato groups to the molecule, a liquid polyether having predominently secondary hydroxyl end groups containing from 3 to 8 hydroxyl groups per molecule and water in the absence of a catalyst for said interaction.

2. A process as claimed in claim 1 wherein the polyether has at least 3 hydroxyl groups for each 500 units of molecular weight.

3. A process as claimed in claim 1 wherein the diarylmethane diisocyanate is selected from the group consisting of diphenyl methane diisocyanate and phenyltolylmethane diisocyanate.

4. A process as claimed in claim 1 wherein the organic polyisocyanate composition has a carbamyl chloride content such that the measured ionizable chloride content is from 0.01% to 3.0% by weight.

5. A process as claimed in claim 1 wherein the polyether is a reaction product of a 1:2-alkylene oxide and a polyol containing from 3 to 8 hydroxyl groups per molecule.

6. A process as set forth in claim 1 in which said polyether is the product of polymerizing at least one cyclic ether comprising a major proportion of propylene oxide in the presence of a basic catalyst.

7. A process for the manufacture of foamed polyurethane products by substantially simultaneously interacting an organic polyisocyanate composition consisting essentially of a diarylmethane diisocyanate and 5% to 50% by weight of organic polyisocyanate having more than two isocyanate groups to the molecule, a liquid polyether containing from 3 to 8 hydroxyl groups per molecule and having predominantly secondary hydroxyl end groups, there being in the polyether about 4 or less hydroxyl groups for each 500 units of molecular weight, and water in the presence of a small proportion of a catalyst for said interaction which is not itself sufficiently active to allow the manufacture of foams by the one shot process from said polyether, water and tolylene diisocyanate, said catalyst being a member of the group consisting of basic material, nonbasic tertiary amine salts and nonbasic metallic compounds soluble in organic solvents and in the absence of organotin catalysts.

8. A process as claimed in claim 7 wherein the polyether has less than 3 hydroxyl groups for each 500 units of molecular weight.

9. A process as claimed in claim 7 wherein the diarylmethane diisocyanate is selected from the group consisting of diphenylmethane diisocyanate and phenyltolylmethane diisocyanate.

10. A process as claimed in claim 7 wherein the organic polyisocyanate composition has a carbamyl chloride content such that the measured ionizable chlorine content is from 0.1% to 3.0% by weight.

11. A process as claimed in claim 7 wherein the polyether is a reaction product of a 1:2-alkylene oxide and a polyol containing from 3 to 8 hydroxyl groups per molecule.

12. A process as set forth in claim 11 in which said polyether is the product of polymerizing at least one cyclic ether comprising a major proportion of propylene oxide in the presence of a basic catalyst.

13. A process as claimed in claim 6 in which the polyether is the product of reacting sucrose with propylene oxide and has a molecular weight of 947, a hydroxyl value of 474 mg. KOH/g. and a viscosity of 2425 centistokes at 25°C.

14. A process as claimed in claim 12 in which the polyether is the product of reacting sucrose with propylene oxide and has a molecular weight of 947, a hydroxyl value of 474 mg. KOH/g. and a viscosity of 2425 centistokes at 25°C.

15. A process as claimed in claim 13 in which the polyisocyanate composition is the crude product of phosgenating a mixture of diaminodiphenylmethane containing polyamines obtained by condensing an aromatic amine with formaldehyde.

16. A process as claimed in claim 14, in which the polyisocyanate composition is the crude product of phosgenating a mixture of diaminodiphenylmethane containing polyamines obtained by condensing an aromatic amine with formaldehyde.

17. A process as set forth in claim 12 in which the polyether is the product of reacting trimethylol propane with propylene oxide which has an hydroxyl value of 479 mg. KOH/gm, a molecular weight of 454, and a viscosity of 1152 centistokes at 25°C., and wherein the catalyst is dimethylbenzylamine lactate.

18. A process as claimed in claim 17 in which the polyisocyanate composition is the crude product of phosgenating a mixture of diaminodiphenylmethane containing polyamines obtained by condensing an aromatic amine with formaldehyde.

* * * * *

UNITED STATES PATENT OFFICE
CERTIFICATE OF CORRECTION

Patent No. 3,880,781    Dated April 29, 1975

Inventor(s) John Frederick CHAPMAN et al

It is certified that error appears in the above-identified patent and that said Letters Patent are hereby corrected as shown below:

IN THE HEADING:

Please add the following information:

[30]   Foreign Application Priority Data

August 15, 1958   United Kingdom . . . . . . 26318/58

Signed and Sealed this nineteenth Day of August 1975

[SEAL]

Attest:

RUTH C. MASON
Attesting Officer

C. MARSHALL DANN
Commissioner of Patents and Trademarks